Feb. 20, 1934.  V. ANDERSON ET AL  1,947,449
FILAMENT MAKING MACHINE
Filed Aug. 21, 1930   8 Sheets-Sheet 6

Fig. 9.

INVENTORS:
Victor Anderson
D.G. Trutner
BY Morrison, Kennedy & Campbell
ATTORNEYS.

INVENTORS:
Victor Anderson
D. G. Trutner
by Morrison, Kennedy
& Campbell, ATTORNEYS.

Feb. 20, 1934.    V. ANDERSON ET AL    1,947,449
FILAMENT MAKING MACHINE
Filed Aug. 21, 1930    8 Sheets-Sheet 8

INVENTORS:
Victor Anderson
D. G. Trutner
BY Morrison, Kennedy & Campbell,
ATTORNEYS.

Patented Feb. 20, 1934

1,947,449

UNITED STATES PATENT OFFICE 1,947,449

FILAMENT MAKING MACHINE

Victor Anderson, North Bergen, and Donald G. Trutner, North Arlington, N. J., assignors to Alfred Hofmann & Company, West New York, N. J., a corporation of New Jersey Application August 21, 1930. Serial No. 476,778

22 Claims. (Cl. 29—33)

This invention is a novel filament making machine adapted for the manufacture of filaments such as are used in various types of lamps, bulbs or vacuum tubes. The invention has more particular reference to the production of filaments such as are embodied in thermionic valves or audions employed in the radio art, and the machine herein illustratively disclosed is especially adapted for the manufacture in quantity of such filaments.

One kind of radio tube filament is composed of a thin molybdenum wire, strip or ribbon which, in order to increase its ionic discharge, is coated with a suitable material such as oxide of strontium, oxide of barium, or the like, which coating is delicate and subject to injury. The stock of coated strip is supplied in rolls, from which the strip is to be drawn and severed into appropriate lengths for the individual filaments. One object of the present invention is to provide an efficient machine with accurate means for cutting or severing the stock or strip into the desired lengths.

Another object of the invention is to provide such a machine in which a short length of coating will be scraped from the end portions each filament, as is necessary to permit the subsequent uniting by welding or soldering of the filament ends to the leads of the audion; this object preferably being secured by a scraping of the adjoining ends of each two filaments before the severing thereof at the scraped portion.

Another object is to provide in such a machine means for forming and applying a wrapping or tab of suitable metal, such as nickel, to each of the scraped ends of the filaments in order to facilitate their subsequent attachment by welding to the leads of the audions.

Another object is to provide a filament making machine in which some or all of the aforesaid operations are carried out automatically in exact coordination; and a further object is to permit adjustments of the machine, for example to vary the lengths of the filaments produced.

Other and further objects and advantages of the invention will be pointed out in the hereinafter following description of an illustrative embodiment thereof or will be understood by those conversant with the subject. To the attainment of such objects and advantages the present invention consists in the novel filament making machine, and the novel features of operation, combination, construction and arrangement herein illustrated or described.

In the accompanying drawings, illustrating the invention.

Figures 13, 14, 16, 17, 18:
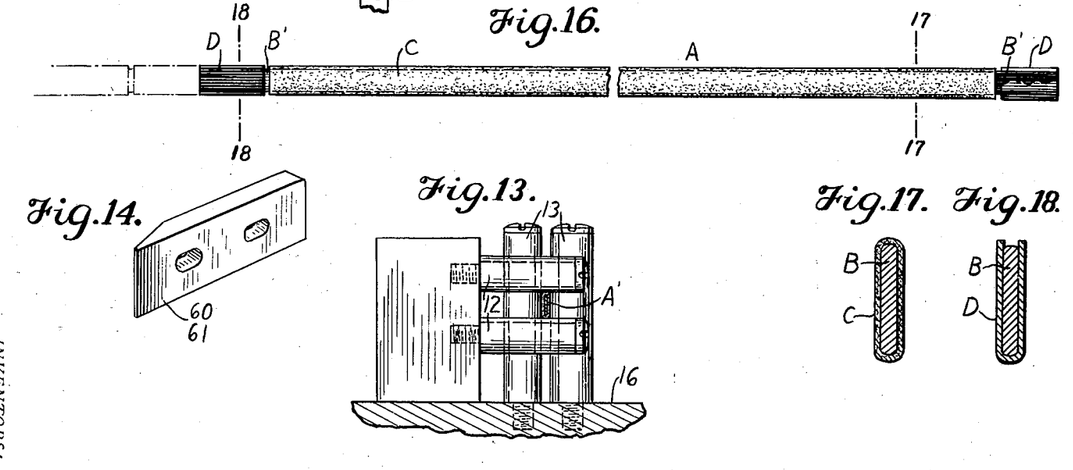
Fig. 13 is a left elevation view of the filament guiding and straightening means between the supply and scraping point.
Fig. 14 is a perspective view of one of the scraping blades.
Fig. 16 is an enlarged side view of a completed individual filament and with tabs applied to the bared ends thereof.
Fig. 17 is a transverse sectional view of the filament taken on the line 17—17 of Fig. 16.
Fig. 18 is a similar transverse sectional view taken on the line 18—18 of Fig. 16, through the bared end and tab.
Figure 15:
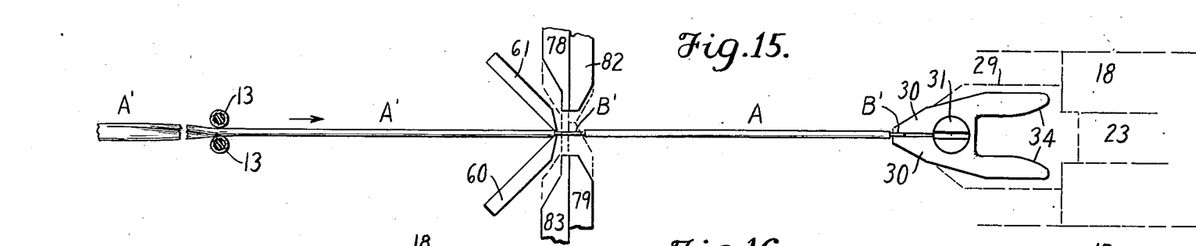
Fig. 15 is a diagrammatic plan view illustrating the method of the present invention and showing the filament guiding, scraping, severing and feeding means.

An example of the product or filament to be produced on the machine of this invention is illustrated in Figs. 16 and 17. The individual filament A is shown centrally broken out in Fig. 16 to indicate that it is proportionately much longer than illustrated. The completed filament consists of a core or strip B for example of molybdenum wire, with a coating C of suitable oxide as already mentioned and as shown also in cross section in Fig. 17. As an example the filament may be somewhat under 2 inches in length composed of a ribbon or strip of width .012 inch and thickness .002 inch. The extreme ends of the filament are scraped clean of the oxide leaving bared ends B' taking part in the subsequent attachment in the audion. The method generally is indicated in Fig. 15. The supply strip A' of filament advances rightward through a guiding and straightening device 13 and thence to a scraping device comprising opposite blades 60, 61 which are shown as having scraped a short section of strip to remove the oxide. To the right of the scrapers is the severing device 78, 79 positioned to sever the strip centrally of the bared length. At the extreme right is shown the feeding device or gripper 30 which has engaged one bared end of the filament and advanced it rightward to the position shown, the scrapers having come into play to scrape a short length of strip sufficient to form the bared ends of two filaments and the severing device being about to operate to sever the completed filament A.

The application of metallic tabs D to the bared ends of each filament is preferable, but optional as they may be applied manually. They are omitted in Fig. 15, but such tabs are shown as applied in Fig. 16, while Fig. 18 shows the same in cross section pressed snugly around two sides of the bared end of the filament. The supply of nickel strip D' for tabbing purposes is indicated in other figures as coming from a supply reel or spool adjacent to that supplying the strip for the filament.

Figures 1, 2:
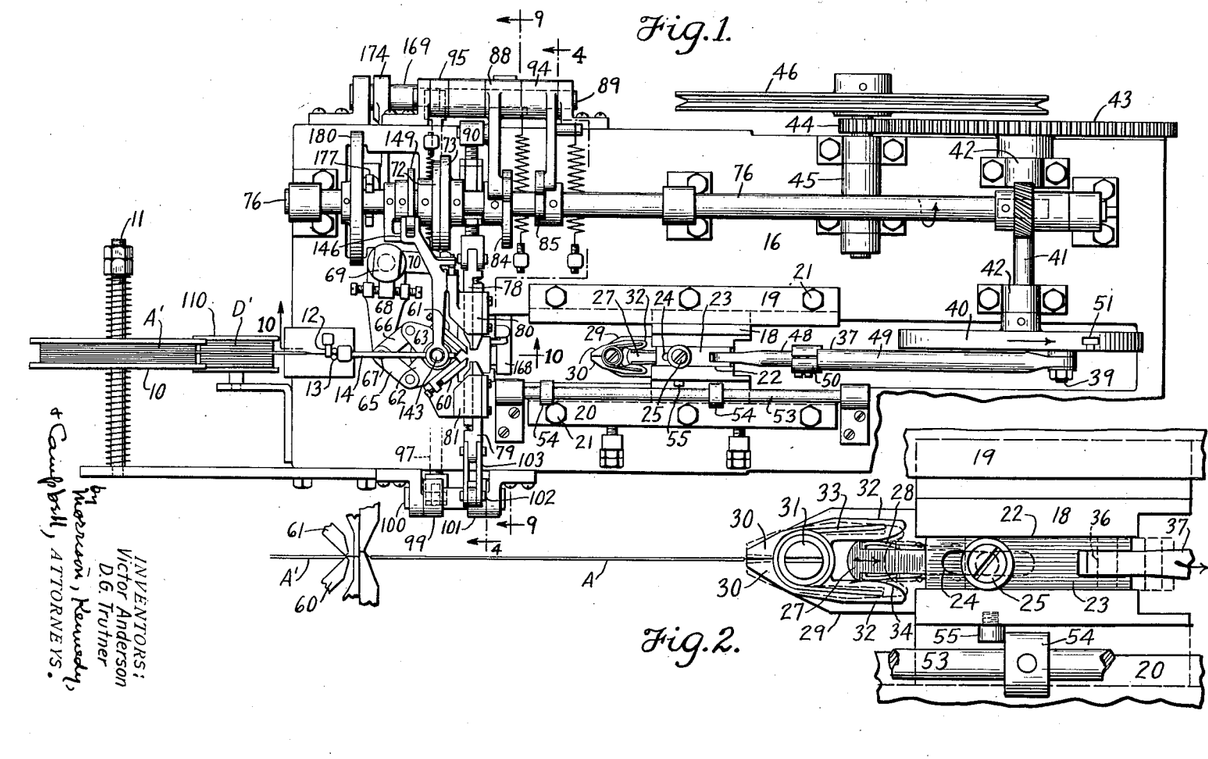
Figure 1 is a top plan view of the filament making machine.
Fig. 2 is a top view of portions of the machine on a larger scale, and showing the severing of a filament after feeding and scraping operations.
Figure 3:
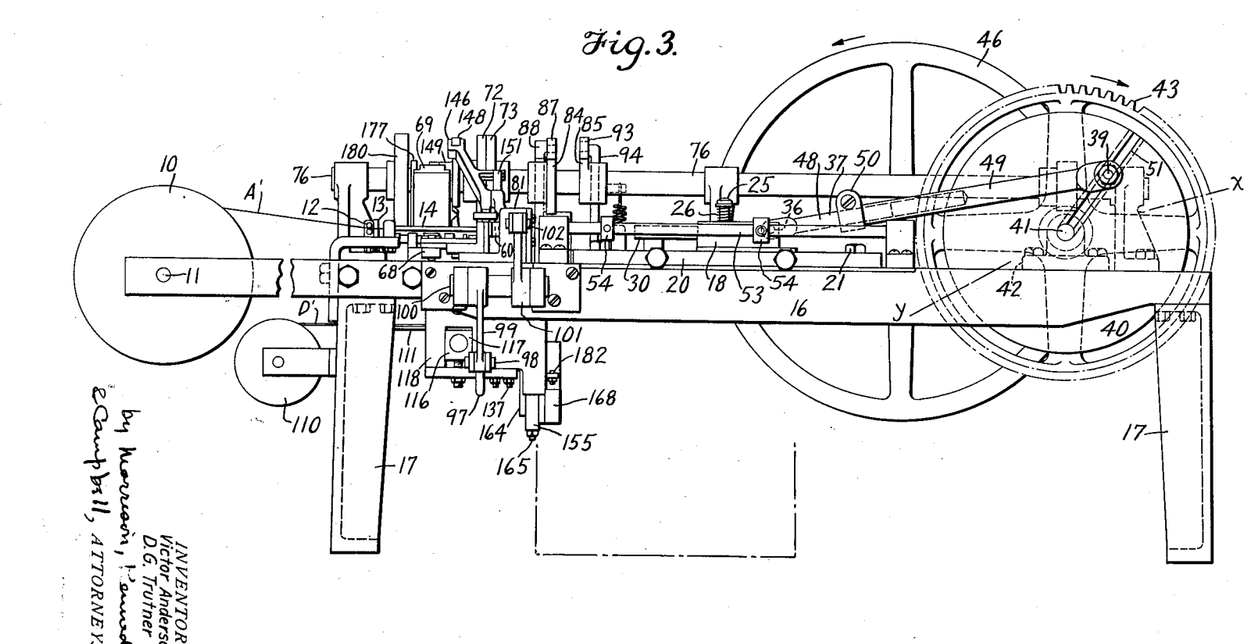
Fig. 3 is a front elevation of the machine shown in Fig. 1.

Referring to Figs. 1 and 3 the filament stock is fed longitudinally towards the right from a stock roll or spool 10 by means of a reciprocating feed mechanism or gripper which acts intermittently to draw the requisite length of strip from the source of supply. During the feeding stroke the strip is acted upon by the scraping means so that portions of its opposite sides will be scraped clean of coating over a length extending to both sides of the severing point. The strip is severed by the cutting means on a line substantially midway of the scraped length, preferably while the strip is still engaged by the scrapers, although the scrapers might be positioned differently and complete their operation before the feeding stroke terminates.

The filament supply roll 10 is shown rotatably supported upon a shaft or arbor 11 near the left end of the machine. The filament strip is wound flatwise upon the roll 10, but as it is drawn off it is fed between a pair of horizontally disposed guide rods or rollers 12 and a similar pair of vertically disposed guides 13, the latter being spaced more closely than the former and operating to twist the strip through a quarter turn between the supply roll and guide rollers, and straighten it. The guide rollers 12 can either precede or succeed the rollers 13, and they receive the strip in its vertical position, as seen in Fig. 13, and aline it properly to advance through the rollers 13 and the succeeding horizontal guide tube 14 arranged to deliver the strip to the scraping and severing position.

The machine comprises a base plate 16, shown supported on legs 17, and said base plate constitutes the support for the stock supply as well as for the mechanisms which will next be described in detail.

Referring to the feeding mechanism this comprises a crosshead 18 which is mounted to reciprocate longitudinally above the base plate 16 and is guided by two spaced parallel guide plates 19 and 20, secured to the base plate by bolts 21. In its upper surface, the crosshead 18 is formed with a longitudinal groove 22 in which is secured a block 23 having a longitudinal slot 24 formed adjacent one end, through which slot a stud or screw 25 rises from the crosshead 18. Thus the slot 24 in conjunction with the screw 25 allows the block 23 to have a limited relative movement with reference to the body of the crosshead, and this movement is made use of as a lost motion for opening and closing the gripper jaws to be described. The head of the screw 25 is extended a substantial distance above the upper surface of the block 23 (see Fig. 3) and under it is a compression spring 26 which acts to impose a substantial frictional resistance to the relative sliding between the block 23 and the crosshead. At its left end the block 23 has a narrow extension 27 provided at its opposite sides with flat leaf springs 28 tending normally to spread laterally.

The body of the crosshead 18 also has an extension 29 at its left-hand end serving as a support for a pair of gripper jaws 30 which are pivoted together and to the support 29 by a bolt or post 31. The gripper jaws 30 are formed with rightwardly extending arms 32 engaging against the outer sides of the leaf springs 28. The opposite ends of a coil spring 33 act upon said arms 32 to press them toward each other and maintain their engagement with said springs 28. The spring 33 therefore acts normally to move the jaws 30 away from each other, and open the gripper. The inner surfaces of the end portions of the arms 32 are curved outwardly as indicated at 34 (Fig. 2) so that when the block 23 is moved relatively to the right the arms are allowed to approach and the jaw members 30 to open, and in this condition they will be capable of receiving the end of the filament stock; while the opposite relative movement of the sliding block 23 cams apart the arms and closes the jaws upon the filament.

To reciprocate the crosshead 18 and its associated parts the right-hand end of the sliding block 23 is pivotally attached as by a pin 36 to the left end of a connecting rod 37, the right end of which is connected by a pin or bolt 39 to an actuating crank or disk 40. This crank disk 40 is secured to the front end of what may be called the drive shaft 41 which is journaled for rotation in standards or bearings 42 on the base plate 16. As best shown in Fig. 1, the drive shaft extends transversely and carries at its rear end a gear 43 driven by a pinion 44 on a power shaft 45 which may be rotated from any suitable source of power as by a belt pulley 46.

Adjusting means are desirable to vary the stroke of the crosshead whereby to vary the length of filament, and for this purpose the connecting rod 37 is shown adjustable in length by means of two telescoping sections 48 and 49 that may be set and clamped by the clamping member 50. This permits the crank pin or bolt 39 to be adjusted radially in a slot 51 in the crank disk 40, to vary its throw and the length of feed by the gripper.

When the throw is set to the proper length of feed the rod 37 is adjusted to set the gripper so that at its left or retracted position it will engage correctly the projecting extremity of the filament strip.

In order to predetermine the limits of reciprocation of the crosshead 18, and thereby control the gripper movement and action the following means are shown. Above the front guide plate 20 is a longitudinal bar 53, slightly spaced from the front edge of the crosshead 18 and parallel to the direction of movement thereof, and said rod or bar is provided with a pair of stops or collars 54 which function to limit the movements of the body of the crosshead, and are adjustable to predetermine the movement. For cooperation with said adjustable collars or stops 54 the crosshead is provided with a forwardly projecting shoulder or pin 55 which in one extreme position will engage the right-hand collar 54, and in its other extreme position will engage the left-hand collar. The distance between the collars is sufficiently less than the throw of the crank to bring the previously mentioned lost motion into play, at each end of the stroke and cause the opening of the grippers at their extreme right and their closing at their extreme left limit of movement. As the gripper retracts leftward to gripping position the left stop 54 stops the crosshead and open gripper, and the continued motion of the rod 37 and block 23 causes the cam extension 27 to close the jaws upon the strip, this condition being retained until the advancing grippers are stopped at the right end of their travel by the right stop 54, and then opened to release the filament.

Referring next to the scraping means, and particularly to Figs. 5-8, 10 and 14, there are shown a pair of co-operating scraper blades 60 and 61 arranged to be first moved into closely spaced relation to scrape the strip coating from both sides of the advancing strip, without injuring the metallic core, and to separate after the correct length of strip has been scraped. The two blades are shown adjustably secured to arms 62 and 63 which are pivotally mounted upon a fixed post 64 upstanding from the base plate 16 of the machine. These arms 62 and 63 are angularly related to each other, and their outer ends are connected by a pair of toggle links 65 and 66 whose ends are connected by pivot 67 to each other and to the arm 68 of a bell crank lever fulcrumed at 69. The other arm 70 of the bell crank is shorter than 68 and is provided with two cam rollers 71 which are adapted to be engaged respectively by the peripheries of two cams 72 and 73, such engagement being maintained by the pull of a tension spring 74, one end of which is secured to the bell crank arm 70, and the other end anchored on a post 75 on the base plate. The arm 68 is shown as compound, one part being adjustable by a double screw device shown in Fig. 5 relatively to the other part to determine exactly the correct setting of the scraper blades, although the uniform pull of spring 74 determines the scraping pressure.

Figure 5:
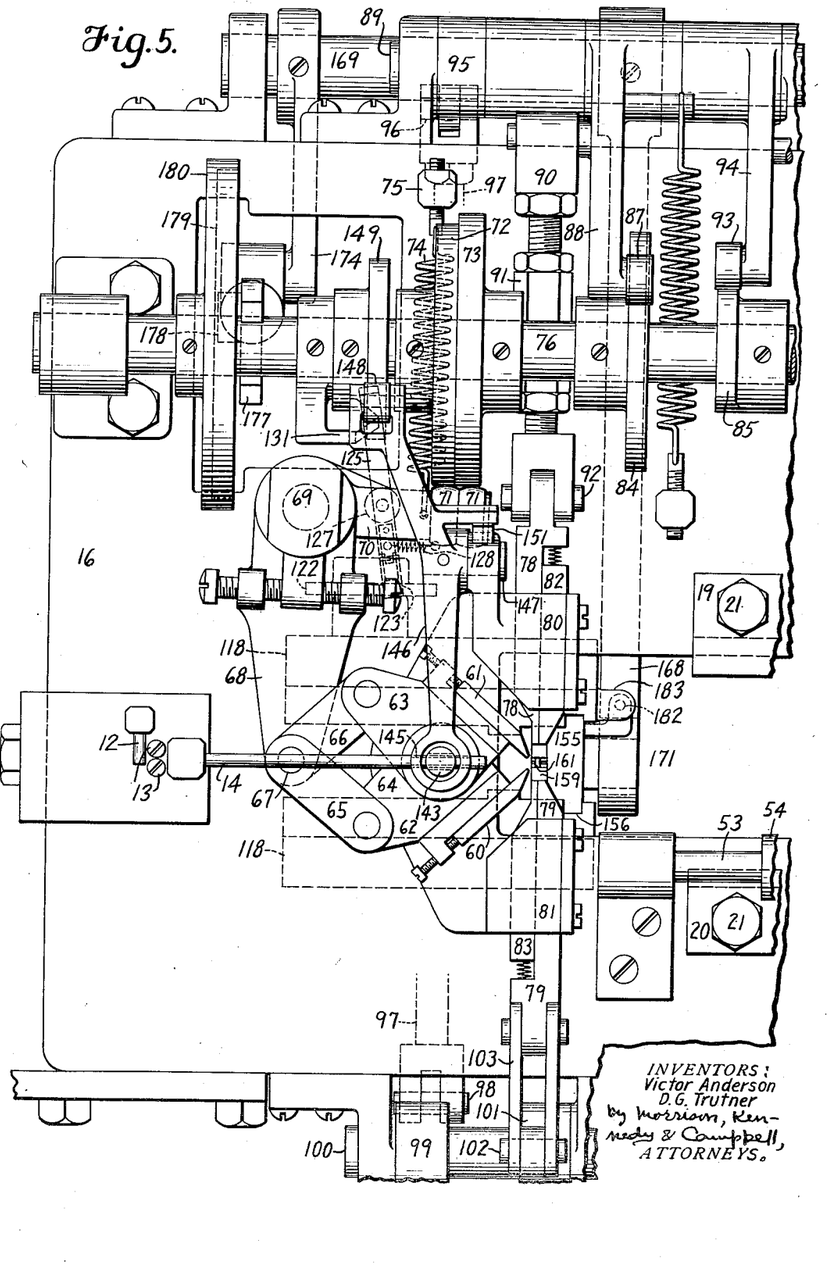
Fig. 5 is a partial top plan view on a larger scale than that of Fig. 1, and showing more completely the scraping and severing means as well as the cams coordinating the various operations of the machine, with the parts in normal or retracted position.
Figure 8:
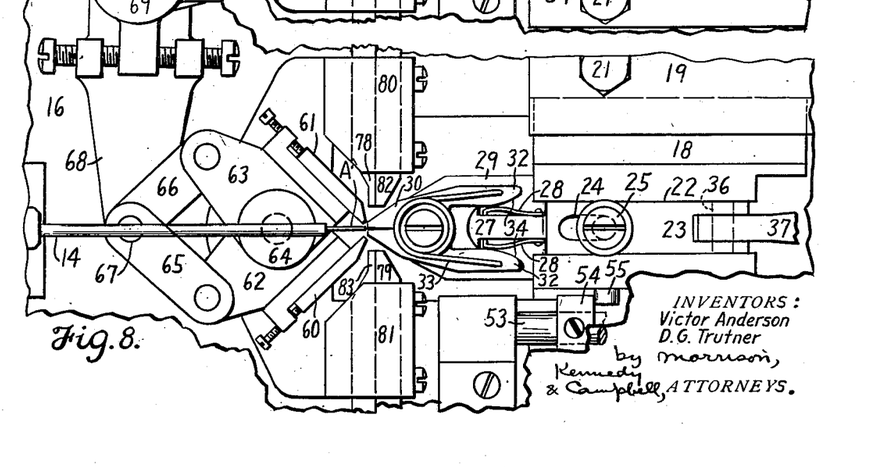
Fig. 8 is another similar view but showing the scraper device disengaged from the strip, and the gripper about to return on its feeding stroke.

The cams 72 and 73 are secured to and rotatable with a cam shaft 76 journaled near the rear of the machine, driven in one-to-one ratio as shown from drive shaft 41, and the cams are so formed as to rock the bell crank 68—70 at certain definitely timed intervals whereby to move the sharp inner corners of the scraper blades 60 and 61 into and out of engagement with the coated filament strip as it is drawn along its path of travel. During the major portion of the feeding operation the cams cause the scraper blades 60 and 61 to stand in their inactive positions as best shown in Figs. 5 and 8, but at a proper time, preferably near the end of the feeding stroke the cams allow the spring 74 to rock the bell crank, and such movement being transmitted through the toggle links 65 and 66 causes the scraper plates to move together and engage the opposite sides of the filament strip as in Figs. 6 and 7. Such engagement is maintained for a short distance, and causes the oxide coating to be scraped from a corresponding portion of the filament, the scraper plates preferably maintaining their engagement with the strip after the feed has ceased to hold it in position until the same has been severed as in Fig. 6 and thereafter until the gripper jaws 30 have approached and gripped the scraped and severed end of the wire as in Fig. 7 preparatory to the next advancing stroke. Thereupon, and before the gripper jaws start their next feeding stroke, the cams 72 and 73 act upon the bell crank to withdraw the scraper plates again into their inactive position, thus allowing the wire to be fed through for the next length of filament without injury to the coating.

Figure 4:
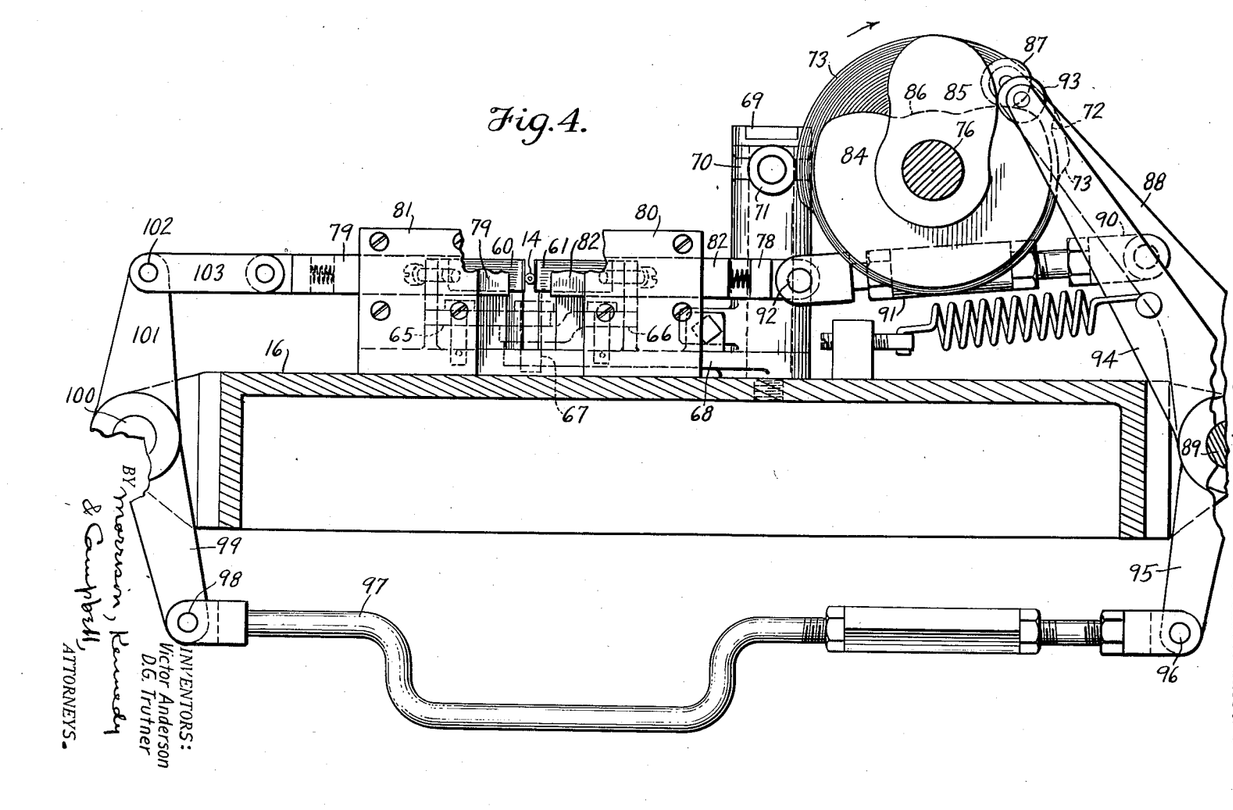
Fig. 4 is a vertical transverse sectional view taken approximately on the line 4—4 of Fig. 1, looking from the right, and with some parts broken away.

The contours of the cams 72 and 73 are indicated in Fig. 4. The reason there are two cams acting on two rollers 71 on the same bell crank arm is to provide means for varying the length or duration of the scraping action. Both of the cams 72 and 73 are substantially alike in size and outline, and being mounted in side by side relation, they function as a single cam. But they are independently adjustable on the shaft 76, and by turning one of them with reference to the other, the effective circumferential distance between the rise and fall can be varied. Such an adjustment makes it possible to adjust the commencement of the scraping action to an earlier or later point in the cycle of operations through one of the cams, and this correspondingly lengthens or shortens the extent of the scraped portion of the filament. The position of the other cam determines when the scrapers are withdrawn, which should be just before the next feed action commences after the gripper has taken hold of the strip.

The scraping action is shown as taking place closely adjacent to the severing point, but it might be some distance in advance by timing the cams to cause both the engagement and disengagement of the scrapers during travel, producing a bare length which will come to rest at the severing point.

The cutting or severing of the strip into individual filaments is accomplished by means of opposed shearing members or blades 78 and 79 which are suitably supported in fixed guides 80 and 81 at opposite sides of the path of travel of the filament and in a line immediately to the right of the scraping means. Mounted at the side of the shearing blade 78 is a yieldable bar or finger 82 in longitudinal alinement with the shearing blade 79, and similarly associated with the shearing blade 79 is a yieldable bar or finger 83 in longitudinal alinement with the shearing blade 78. The inner face of each yielding bar normally alines with its blade so that all four members come to the filament at once, the two bars yielding with substantial resistance as the blades effect the shearing thus preserving the alinement of the strip.

The shearing blades 78 and 79 are movable toward and from each other under individual control by cams 84 and 85. These cams are best shown in elevation in Fig. 4, from which it will be seen that the major portion of the cam 84 is concentric but provided at one side with a depression 86. A roller 87 on the end of a lever 88 engages the periphery of said cam 84 in such a manner as to rock the lever 88 loosely on a rear shaft 89. The lever 88 has a pin connection 90 for one end of a link 91, the other end of which extends forwardly and is pivotally connected as at 92 to the rearward end of the shearing member 78. The formation of the cam 84 is such as to maintain the shearing member 78 in its retracted position during the major portion of the rotation of the cam shaft 76, and at the proper time to advance said shearing member to a position wherein it will engage the rear side of the filament stock and dwell there until the severing is completed.

The cam 85 for the other severing blade is smaller than the cam 84 and has its periphery engaged by a roller 93 on the upper end of a rock lever 94 which is mounted fast upon the shaft 89. Another rock lever 95 extends downwardly from the shaft 89 at the rear edge of the base plate 16 and has connected to its lower end at 96 the rearward end of a long link 97 which extends forwardly below the base plate. This link 97 has its forward end connected at 98 to a rocker arm 99 which is supported upon a short horizontal rock shaft 100 at the front of the base plate, and actuates an upwardly extending lever 101 having its upper end connected at 102 to a pair of spaced parallel links 103 extending to the forward end of the shearing member 79.

The movement of the shearing member 79 by the cam 85 is preferably greater than the movement of the shearing member 78 by the cam 84. The arrangement as shown is such that while the shearing member 78 advances only to a point where it engages the rearward side of the filament, and there stops, forming a fixed shearing point, the shearing member 79 comes to the filament and moves further so as actually to effect the shearing, the slidable bar 82 yielding rearwardly with reference to its shearing member 78 and the bar 83 yielding relatively to member 79. With this arrangement during the shearing operation and immediately thereafter the strip and both sections of it are oppositely engaged at both sides of the line of shear, which is particularly important in severing thin flexible material because it makes possible the shearing action without deflecting the supply end of the material from its designated line of travel. The bars 82 and 83 act as guards, preserving the alinement of the strip during severing, and avoiding bending of the strip.

The line of severance is midway of the scraped portion of the strip, and by reason of this fact the severed filament resulting from each complete cycle of operations will have both of its ends bare, facilitating its subsequent mounting in an audion or similar tube.

The preferred operation of the machine thus far described is as follows. The shaft 41 and disk 40 rotate continuously clockwise as viewed in Fig. 3, and the cam shaft 76 rotates clockwise as viewed in Fig. 4. Thus when the crank pin 39 is in the position of Fig. 3 the crosshead 18 is moving to the right and drawing with it the filament strip, the end of which is firmly grasped by the gripper jaws 30, which have nearly completed their advancing feed movement. As the parts reach this position, the combined cams 72 and 73 will have turned to the point where the peripheral surface of smallest radius comes into engagement with the rollers 71 on the bell-crank arm 70, thus allowing the spring 74 to rock the bell-crank in a counterclockwise direction as viewed in the plan view, and the forward end of the arm 68 moves quickly toward the right and acts through the toggle links 65 and 66 to swing the scraper arms 62 and 63 so as to bring the scraping edges of the scraper blades 60 and 61 into scraping engagement with the opposite flat surfaces of the filament stock. The scraper blades are maintained in this position during the short remaining portion of the feeding stroke with the result that the oxide coating is removed from a portion of the filament. The scraping pressure is determined by the pull of the spring 74 and is therefore uniform and predetermined, by adjustment, to give a clean scraping action without injuring the metallic core of the filament.

At the same time that the scraping action is taking place, the cams 84 and 85 are acting through the above described levers and links to move the shearing members 78 and 79 inwardly toward each other. The member 78 comes to rest just as it reaches the rearward side of the filament stock, while the member 79 continues in movement, passing the member 78, with shearing action, until the strip is severed, while the adjacent fingers assist holding the strip against displacement. This shearing action takes place just as the feeding stroke is ended, i. e., when the crank pin 39 has reached about the position indicated by the radial line x, and the crosshead body having been stopped by engagement of the pin 55 against the right-hand stop collar 54.

As the crank pin moves on from position x to the dead center, the block 23 moves rightwardly in the cross-head body, drawing the extension 27 and its flat springs 28 outwardly from between the gripper arms 32, and at the limit of the stroke the arms 32 are free to move under the action of spring 33 to open the gripper jaws 30 and release the filament which has just been cut, allowing it to drop and be received in a suitable receptacle.

Figure 6:
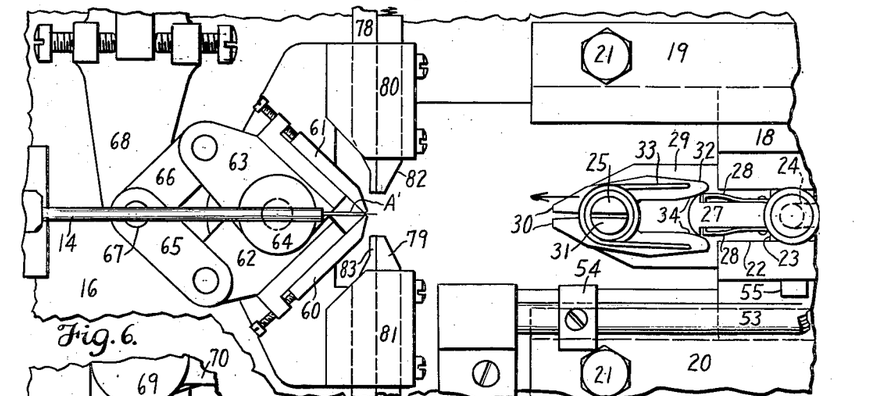
Fig. 6 is a view similar to Fig. 5 of the portions adjacent the scraping and severing position showing the parts in a different stage of operation, with the feeding gripper being moved back toward the next section of filament.
Figure 7:
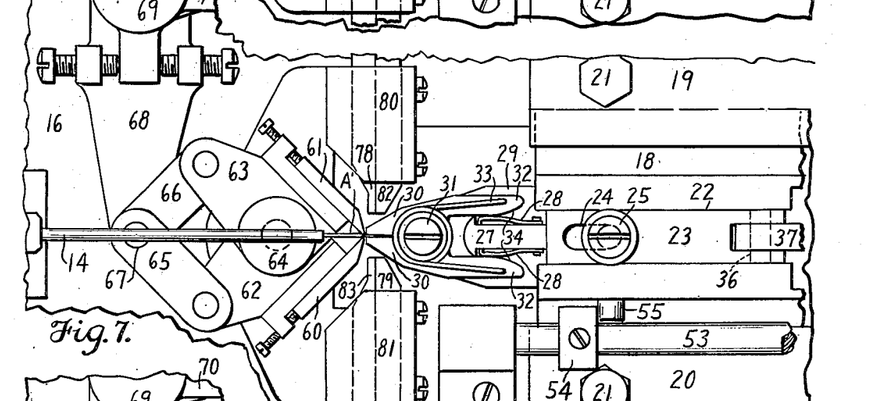
Fig. 7 is a similar view but showing the gripper fully retracted and gripping the end of the filament strip while the latter is still engaged by the scraping device.

Continued rotation of the crank disk carries the pin 39 through the lower half of its throw, retracting the crosshead and moving the gripper toward the projecting end of the filament supply strip, which is still positioned by the inwardly held scraper blades. During this return stroke the gripper jaws 30 are open as shown in Fig. 6. When the crank pin 39 reaches nearly to its left-hand dead center, the crosshead 18 is stopped by abutment of the pin 55 with the left-hand stop collar 54 and at this time the open jaws 30 have embraced the end of the filament stock. Thereafter, the block 23 moves relatively toward the right in the crosshead, pushing the extension 27 into the space between the gripper arms 32, and acting on said arms to move the jaws 30 inwards into gripping engagement with the filament strip. Just before or about as the gripper jaws grip the strip, the cams 72 and 73 act upon the rollers 71 to rock the bell-crank 69 in a clockwise direction, moving the scraper blades out to their retracted positions, thus completing the cycle of operations, which may be repeated indefinitely as long as the strip supply lasts.

The machine described in the foregoing description constitutes a complete scraping and severing machine for filaments having great utility and effecting great economies over hand production, and improvement of product. It may be used without supplemental mechanism, but in some instances it is desirable to apply metallic reenforcing tabs or wrappings to the ends of the filaments in order to facilitate their attachment to the leads of the audions. Such a tab is indicated in Figs. 16 and 18, as already stated, and comprises a small strip or piece of sheet nickel or foil D folded over and squeezed onto the scraped portion of the filament. The machine herein illustrated is provided with means for forming and applying such tabs, and these means will now be described in detail, referring specially to Figs. 9 to 12, wherein the parts are shown in a different position from the other figures, namely when the radial slot 51 of disk 40 has shifted around to the radial position y, Fig. 3.

Rotatably mounted below the filament supply roll 10 is a supply roll 110 for a flat band or ribbon D' of thin sheet nickel. The ribbon is fed rightwardly over a supporting and guiding bar 111 and between two opposed feeding and shaping rolls 112 and 113, which effect an intermittent feeding of the tab ribbon D' longitudinally and deliver it in a form with a V-shaped cross-section. For this purpose, the lower roll 112 has its periphery formed with a circumferential groove 114 of suitable shape, while the upper roll 113 is formed with a complementarily shaped circumferential rib 115. The lower roll 112 is secured to a shaft 116 which is journaled for rotation in adjustable bearing boxes 117 in the side wall of a box-like casting 118 secured to the lower side of the base plate 16. The upper roll 113 is secured to a shaft 119 which is journaled in the side walls of said casting. The rear ends of said shafts are extended and fitted with gears 120 and 121 which mesh with each other and by means of which the rolls will be rotatable in unison in opposite directions.

Figure 9:
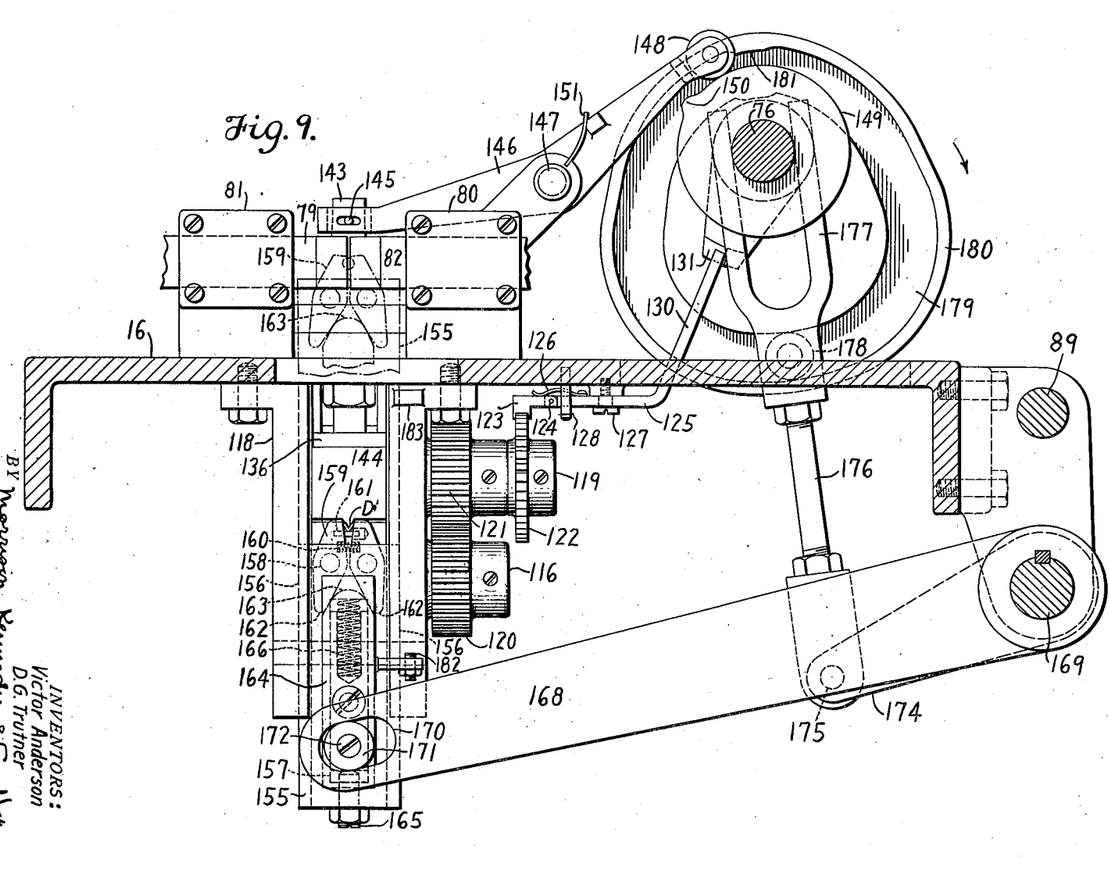
Fig. 9 is a vertical transverse sectional view taken approximately on line 9—9 of Fig. 1, looking from the right, and showing more particularly certain details of the tab forming and applying mechanism.
Figures 10, 11, 12:
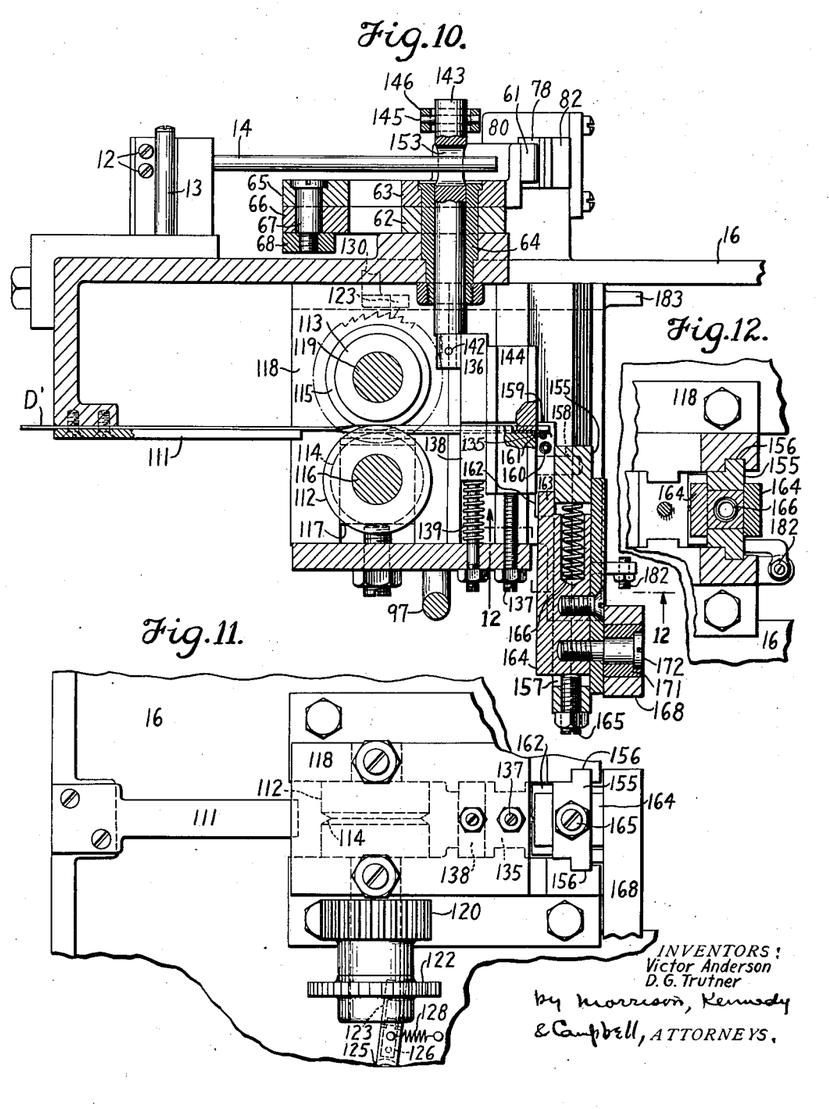
Fig. 10 is a vertical longitudinal sectional view taken on the central line 10—10 of Fig. 1, showing details of the tabbing mechanism.
Fig. 11 is a partial bottom plan view of the mechanism illustrated in Fig. 10.
Fig. 12 is a horizontal sectional view looking upward on the line 12—12 of Fig. 10.

To rotate intermittently the rolls 112 and 113, a ratchet mechanism is shown, as best shown in Figs. 9, 10 and 11. This comprises a ratchet 122 secured to the end of the upper shaft 119 and an actuating pawl 123 in engagement with the upper side thereof. The pawl 123 is pivoted at 124 on one end of a lever 125, and is yieldingly held against the ratchet by a flat spring 126. The lever 125 is pivoted at 127 on the lower side of the base plate 16 and extends rearwardly from the ratchet, and it is acted upon by a tension spring 128 which normally holds it in a definite position. The rear end 130 of the lever 125 is bent upwardly and extends through a suitable slot in the base plate, and is in the path of movement of a cam 131 having a beveled offset end and secured to the cam shaft 76. Thus for each revolution of the cam shaft, the cam 131 will strike the end of the lever 125 and rock the same against the action of the spring 128 sufficiently to rotate the ratchet 122 a distance of one unit or tooth. This movement causes the rolls 112 and 113 to be rotated a corresponding extent, advancing the tab material an amount equal to the length of a double tab to be cut from it, which will be slightly shorter than the bared or scraped portion of the filament strip before severing.

The tab material as thus fed, is next severed into tabs by a pair of cooperating shearing members 135 and 136, arranged in adjacent planes. The shearing member 135 is in the nature of a block which is supported in fixed position below the path of travel of the material, and it is adjustable by means of a screw 137. Associated with and alongside the block or shearing member 135 is a cushioning piece 138 yieldingly supported by a spring 139, this piece 138 being also arranged below the path of travel of the tab material, but in alinement with the upper shearing member 136. By this arrangement, the cushioning piece 138 serves to support the material both before and after it is cut, it being free to move downwardly with reference to the shearing member 135 during the shearing action.

The upper tab shearing member 136 is adapted to move vertically, it being secured as at 142 to the lower end of a push rod 143 which is slidably supported in the hollow post 64. Near its upper end, the push rod 143 is formed with a slot or opening 153 through which the fixed filament guide tube 14 extends, and with sufficient clearance to permit movement of the push rod without interference with said tube.

Loosely associated with the shearing member 136 is a yielding guide block 144 which is arranged above the fixed shearing member 135 and rests against the same by gravity. The horizontal thickness of the shearing member 135 and guide block 144 is preferably greater than the length of a double tab, so that they can support between them a plurality of tabs, and from which the tabs can be pushed one at a time as will later be explained.

In order to reciprocate the push rod 143 and thus to effect the tab severing operation, the upper end of said rod is pivotally attached as at 145 to the forward arm of a rocker lever 146 which in turn is pivotally supported at 147 on an extension of the fixed guide 80. The rear arm of the rocker lever 146 is offset laterally as shown in Fig. 5 and upwardly as in Fig. 9, and is provided with a small roller 148 which rides on the periphery of a cam 149 secured to the cam shaft 76. The major portion of the periphery of cam 149 is circular but it is provided with a small rise 150. A spring 151 acts upon the rocker arm 146 normally to maintain its forward end and the push rod 143 in the uppermost position when the roller 148 is in engagement with the concentric portion of the cam 149. But as the cam rise 150 passes the roller, it causes the forward end of the rocker arm to be depressed, and in so doing, the shearing member 136 is forced downwardly to sever the tab. The cam 149 is so positioned and related to the other cams on shaft 76 that the shearing takes place at a definite time, namely while the feed rolls 112 and 113 are stationary.

The point at which the severed tabs are successively pushed out and delivered from the shearing means is directly below the scraped portion of the filament, and means for receiving and raising the tab and for applying, crimping or squeezing it upon the filament will next be described.

A transfer carrier or block 155 is mounted for up and down movement within the right-hand end of the box-like casting 118, it being guided by grooves 156 in the side walls of said casting. This transfer block is mounted immediately to the right of the shearing member 135, and is provided with a substantially central vertical way or opening 157. Pivoted on pins 158 at the upper end of the block 155 are two opposed crimping jaws or squeezers 159 which are normally held apart by a small compression spring 160 between them, and one of these jaws carries a tab supporting rod 161, which, when the carrier block 155 is in its lowermost position, is in line to receive a tab as the latter is pushed out from between the shearing members 135 and 144. The lower ends of the jaws 159 are in the nature of arms 162 and have their inner sides tapered as best shown in Fig. 9 to engage the rounded upper end 163 of an actuating member 164. This actuating member 164 is arranged to slide vertically within the way or opening 157 in the transfer carrier 155, and is shorter than said opening whereby to be capable of limited lost motion relatively thereto. The bottom of the member 164 is adapted to engage against the end of an adjustable stop screw 165, mounted at the lower end of the carrier block 155, and the actuating member 164 is held relative down upon the stop by a compression spring 166 socketed in the upper end of the member 164. The strength of this spring is sufficient to overcome the weight of the transfer block 155 and the clamping jaws, thus holding the block normally up in its position as shown, the screw 165 permitting adjustment to the tab delivery position.

For the purpose of raising and lowering the tab carrier and connected parts, a long lever 168 is shown, it being secured to a rock shaft 169 at the back of the machine, and having a slot 170 in its front end for the accommodation of a roller 171. A shouldered screw 172 secures the roller 171 to the actuating member 164 (see Fig. 10). A short lever 174 is also secured to the rock shaft 169, and has its front end pivotally connected at 175 to the lower end of a cam follower rod 176. This rod 176 extends upwardly through a suitable opening in the base plate 16 and its upper end is provided with a long fork 177 which straddles the cam shaft 76 so as to be guided thereby. Intermediate its ends, the cam follower rod 176 has a cam roller 178 which is disposed in the cam track 179 of a cam disk 180 on the shaft 76. This cam is eccentrically formed as shown in Fig. 9, to raise and lower the follower rod 176 in proper time and give it a pause in its lowermost position. At the point of its shortest radius, the cam has a slight but abrupt drop 181 which acts to give the levers 168 and 174 a sudden upward and return movement at the uppermost position of the follower rod, this for closing and opening the squeezers or crimping jaws 159 in applying a double tab to the unsevered scraped part of the filament strip.

Just before this abrupt short lift movement takes place, the transfer carrier is stopped by the abutment of a stop screw 182 thereon against a fixed lug 183, at which time the V-shape tab will have risen to a position in which it embraces the scraped portion of the filament wire. Thereupon, the transfer carrier being stopped against further lift, the slight additional upward movement of the lever 168 will cause the actuating member 164 to move upwardly in the carrier against the pressure of the spring 166, and in so doing, the rounded upper end 163 of the actuating member will spread the arms 162 of the crimping jaws 159, and cause said jaws to move toward each other with a squeezing action which presses the double length tab in place upon the filament. See Fig. 18.

The cam 180 is preferably so related to the other cams on shaft 76 that the tab is applied to the filament immediately after the completion of the scraping operation, and before the severing of the filament by the members 78 and 79 so that the severing which follows will sever both filament and tab, leaving both filament ends properly tabbed. By this operation a single tabbing operation for each filament serves to place tabs upon both ends of each filament, giving the product of Fig. 16.

Having thus described a filament making machine and method embodying the principles and attaining the objects of the invention, it is hereby stated that it is not intended to limit the invention to the particular disclosed matters of operation, combination, construction and arrangement except to the extent set forth in the appended claims.

What is claimed is:

1. In a machine for manufacturing filaments from a coated supply strip, timed means operating to grip the strip end and pull successive measured lengths of strip advancingly from the supply through the scraping and severing positions, timed means operating between the supply and severing position to scrape coating from a short section of strip at measured intervals, and timed means operating to sever the strip at the successive scraped sections thereof, thereby to produce successive coated filaments of measured length each having both ends bare of coating.

2. In a machine for manufacturing filaments from a coated supply strip, timed means operating to grip the strip end and pull successive measured lengths of strip advancingly from the supply through the scraping and severing positions, timed means operating between the supply and grip means to scrape coating from a short section of strip at measured intervals, and operating to sever the strip at the successive scraped sections thereof, thereby to produce successive coated filaments of measured length each having both ends bare of coating.

3. In a machine for manufacturing filaments from a coated supply strip, timed means operating to grip the strip end and pull successive measured lengths of strip advancingly from the supply through the scraping and severing positions, timed means operating between the supply and severing position to scrape coating from a short section of strip at measured intervals, and timed means operating between the scraping means and pulling means to sever the strip at the successive scraped sections thereof, thereby to produce successive coated filaments of measured length each having both ends bare of coating.

4. In a machine for manufacturing filaments from a coated supply strip, timed means operating to scrape coating from a short section of strip at measured intervals, and to sever the strip at the successive scraped sections thereof, thereby to produce successive coated filaments of measured length each having both ends bare of coating, and timed means operating to feed successive measured lengths of strip advancingly from the supply through the scraping and severing positions.

5. In a machine for manufacturing filaments from a coated supply strip, timed means operating to grip the strip end and pull successive measured lengths of strip advancingly from the supply through the scraping and severing positions, timed means operating between the supply and severing position to scrape coating from a short section of strip at measured intervals during advance of strip, and timed means operating between the scraping means and pulling means to sever the strip at the successive scraped sections thereof during pause of strip advance, thereby to produce successive coated filaments of measured length each having both ends bare of coating.

6. A machine as in claim 5 and wherein the severing means is located closely adjacent to the scraping means and timed to operate at the termination of each scraping operation and while the strip is held in position by the scraping means.

7. A machine as in claim 5 and wherein the scraping means is timed to engage and scrape a short section of strip and thereafter retain engagement to position the strip during severing and until the gripping means returns and engages the new strip end.

8. In a machine for manufacturing filaments from a coated supply strip, timed mechanism for scraping a short section of strip during its advance and repeating the action at intervals, timed mechanism for severing each scraped section to leave a scraped tip at each end of each severed length, and timed mechanism for pulling the strip advancingly for successive predetermined lengths between and during the scraping actions.

9. In a filament making machine, reciprocating means for drawing a coated filament stock from a supply, said reciprocating means including a gripper adapted to engage and grip the end of the filament stock before its advancing stroke and to release the same at the end of such stroke, scraper members movably mounted at opposite sides of the line of travel of the stock, timed means for moving said scraper members into scraping engagement with the sides of the stock before the end of the feeding stroke, and means for severing the stock midway of the scraped portion, said timed means adapted to maintain the scraper members in engagement with the stock to hold its free end until the gripper jaws return to engage the stock at the beginning of next feeding stroke, and then move the scrapers out of such engagement.

10. In a filament making machine, means for advancing a coated filament supply strip to measure off the length of each filament, means acting on the strip during its advance for scraping a short extent of strip to remove coating therefrom at the adjoining ends of two filaments, means for applying a metal tab to the adjoining ends of two filaments after the scraping but before the severing thereof, and means acting thereafter to sever the strip at the scraped portion, whereby the tab is severed with the filament, and each severed filament carries a tab at each end.

11. In a filament making machine, timed means for advancing a coated filament supply strip to measure off the length of each filament, timed means acting on each length of strip for scraping a short section of strip to remove coating therefrom at the adjoining ends of two filaments, timed means for applying a metal tab to the scraped section, and means acting thereafter at the scraped section to sever strip and tab.

12. In a machine for manufacturing filaments from a coated supply strip, timed means operating to grip the strip end and feed successive measured lengths of strip advancingly from the supply through the scraping and severing positions, timed means for applying metal tabs at measured intervals upon the strip in electrical conducting contact therewith, and timed means operating between the supply and pulling means after the successive feed actions to sever the strip and tab, thereby to produce successive filaments each having both ends provided with tabs adapted to take part in subsequently uniting of the filament with lamp terminals.

13. The combination of means for feeding coated filament strip, means for scraping portions thereof at intervals, means for severing the same at the scraped portions, and means for tabbing the scraped portion.

14. In a machine for manufacturing filaments from a coated supply strip, timed means operating to grip the strip end and pull successive measured lengths of strip advancingly from the supply, timed means operating between the supply and severing position to scrape coating from a short section of strip at measured intervals, timed means for thereafter applying a metal tab in conducting contact upon the scraped section, and timed means operating thereafter to sever the strip and tab at the successive scraped sections, thereby to produce successive coated filaments of measured length each having both ends bare of coating, and tabbed.

15. In a filament making machine, means for feeding filament stock longitudinally from a supply, means for scraping portions of the stock at spaced intervals, and means for applying metal tabs to the scraped portions of the filament stock.

16. In a filament making machine, means for feeding filament stock longitudinally from a supply, means for scraping portions of the stock at spaced intervals, means for applying metal tabs to the scraped portions of the filament stock, and means for severing the stock and the tabs midway of each tab.

17. In a filament making machine, means for intermittently feeding tab ribbon, means for bending the ribbon longitudinally into a V-shaped cross-section, means for cutting individual tabs from the material so bent, and means for applying the tabs to filaments.

18. In a filament making machine, means for feeding filament stock longitudinally from a supply, means for scraping portions of the stock at spaced intervals, means for feeding, forming and severing tab material into tabs, and means for crimping the successive tabs upon the scraped portions of the filament stock.

19. In a filament making machine, means for feeding filament stock horizontally from a supply, means for scraping portions of the stock during travel at spaced intervals, means for feeding tab material at a lower level, means for severing successive individual tabs from the tab material, means for raising each cut tab to present it to a scraped portion of the filament stock, and means for crimping the tab upon said scraped portion.

20. In a filament making machine, means for intermittently feeding coated filament stock from a supply, means for scraping a short portion of the stock at the end of each feeding stroke, cooperating rollers for feeding and forming tab material, ratchet means for rotating said rollers intermittently, means for severing successive tabs from the bent tab material, means for carrying each tab to a scraped portion of the filament stock and crimping it thereto, and means for severing the filament stock and the tab midway of each tab.

21. The method of manufacturing filaments comprising scraping a short section of coated strip at predetermined intervals and severing the same midway of each scraped portion.

22. The method of manufacturing filaments comprising scraping a short section of coated strip at predetermined intervals, crimping a metal tab to the scraped portion and severing the strip and tab midway of each scraped portion.

VICTOR ANDERSON.
DONALD G. TRUTNER.